United States Patent [19]

Chirico

[11] 4,246,065

[45] Jan. 20, 1981

[54] RADIOACTIVE WASTE CONCENTRATION

[75] Inventor: Anthony N. Chirico, Short Hills, N.J.

[73] Assignee: Ecodyne Corporation, Lincolnshire, Ill.

[21] Appl. No.: 973,503

[22] Filed: Dec. 26, 1978

[51] Int. Cl.$^2$ .............................................. B01D 1/30

[52] U.S. Cl. ............................ 159/22; 159/DIG. 12; 159/DIG. 41; 252/301.1 W

[58] Field of Search ................... 159/22, 23, DIG. 12, 159/DIG. 41; 252/301.1 W

[56] References Cited

U.S. PATENT DOCUMENTS

| | | | |
|---|---|---|---|
| 1,415,047 | 5/1922 | Parsons | 417/234 |
| 1,771,889 | 7/1930 | Hobart | 417/234 |
| 1,891,408 | 12/1932 | Gorman | 417/234 |
| 1,958,065 | 5/1934 | Paasche | 417/234 |
| 2,789,756 | 4/1957 | Allen | 230/235 |
| 3,930,942 | 1/1976 | Thome | 176/87 |
| 3,933,576 | 1/1976 | Rushton | 159/DIG. 12 |
| 4,050,638 | 9/1977 | Ito et al. | 252/301.1 W |

*Primary Examiner*—Norman Yudkoff
*Attorney, Agent, or Firm*—Charles M. Kaplan; Joel E. Siegel

[57] ABSTRACT

A pump for a radioactive waste concentrator in a shielded enclosure is mounted on a wheeled vehicle that travels on tracks, and a spare pump is mounted on an identical wheeled vehicle outside of the shielded enclosure, adjacent the tracks. If the pump fails, it is wheeled out of the shielded enclosure, and the vehicle carrying the spare pump is put on the tracks and wheeled into the enclosure for quick connection to the concentrator.

9 Claims, 4 Drawing Figures

Fig. 1.
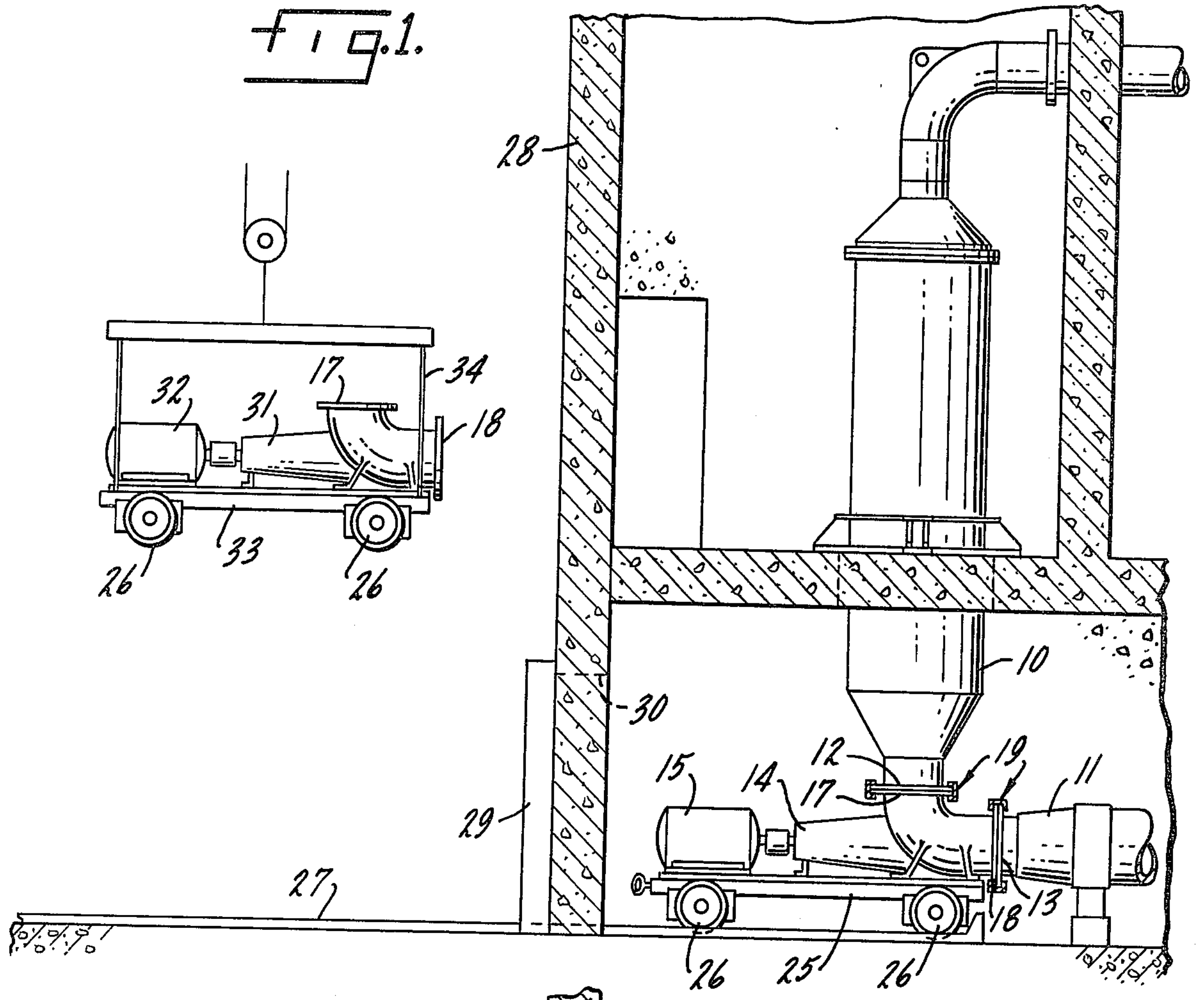
Fig. 2.
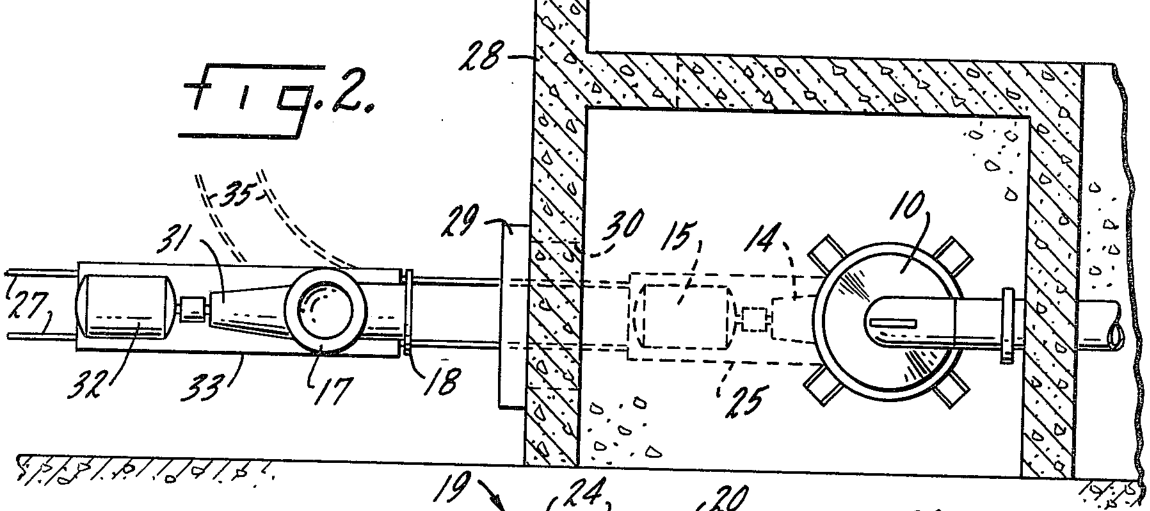
Fig. 3.
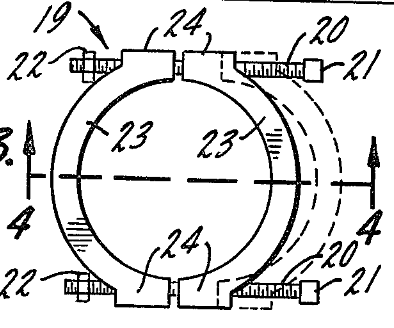
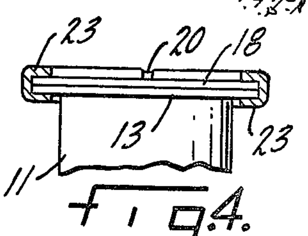
Fig. 4.

RADIOACTIVE WASTE CONCENTRATION

BACKGROUND OF THE INVENTION

When the operation of a pump is vital to a system, duplicate pumps are frequently installed side by side. One such pump can always be maintained as a spare in top operating condition for immediate use should the working pump fail. In systems for concentrating aqueous radioactive waste by evaporation, a large volume of such waste must be pumped continuously through a waste concentrator vessel. If the pump fails, the system must be shut down until a new pump is put into operation. All operating components of a radioactive waste treatment system must be isolated within a shielded enclosure. Installing duplicate large volume pumps in such a shielded enclosure would disproportionately increase the size and cost of the system. Also, personnel who maintain the spare pump would have to enter the shielded enclosure frequently to check it out, and thereby expose themselves to radioactivity.

SUMMARY OF THE INVENTION

Accordingly, it is an object of this invention to provide an improved radioactive waste treatment system.

Another object is to provide spare pumping capacity for radioactive waste concentrators.

Another object is to reduce the time that a radioactive waste treatment plant is shut down when a pump fails.

Another object is to reduce the exposure to radioactivity of personnel who service pumps.

Another object is to provide radioactive waste treatment installations with a spare pump that can be substituted for a failed pump in a short time with minimum exposure of personnel to radioactivity.

Another object is to provide a radioactive waste treatment plant with duplicate interchangeable high volume pumps that are relatively inexpensive, durable, easy and safe to maintain, and which do not possess defects found in similar prior art waste treatment plants.

Another object is to minimuze the size of the radioactivity shield of a waste treatment system that has spare high volume pumping capacity.

Other objects and advantages of the invention will be found in the specifications and claims, and the scope of the invention will be set forth in the claims.

DESCRIPTION OF THE DRAWING

FIG. 1 is a partially cross-sectional, schematic representation of an embodiment of the invention.

FIG. 2 is a top view of the embodiment shown in FIG. 1.

FIG. 3 is an enlarged side view of a quick-release coupling usable in this invention.

FIG. 4 is a cross-sectional view taken along the line 4—4 of FIG. 3.

DESCRIPTION OF THE INVENTION

The drawing shows a portion of a system for concentrating acqueous radioactive waste by evaporation including a generally cylindrical vessel 10 in which such waste is processed and conduit means 11 having a circular cross section for feeding the waste to vessel 10. Vessel 10 has an external circular flange 12 which lies in a horizontal plane and conduit 11 has an external circular flange 13 which lies in a vertical plane.

A first or working high volume pump 14 and its electric motor 15 are capable of feeding 5–15,000 gallons per minute of aqueous waste from conduit 11 through vessel 10. A horizontal flange 17 on pump 14 is essentially a mirror image of flange 12, with which it mates; and a vertical flange 18 on pump 14 is essentially a mirror image of flange 13, with which it mates. As shown in FIGS. 3 and 4, identical quick release couplings 19 connect the mating pairs of flanges 12 and 17, and 13 and 18.

Each coupling 19 comprises a pair of parallel cylindrical rods 20 having a stop 21 at one end and threads at the other end to receive nuts 22. A pair of identical semi-circular channels 23 have holes in their ends which receive rods 20 and shoulders 24 for bearing against stops 21 and nuts 22. Each pair of channels 23 slides in the plane of its mating flanges so as to capture the flanges therebetween, and tightening nuts 22 against shoulders 24 seals the flanges. Unscrewing nuts 22 and separating each pair of channels 23 quickly releases the captured flanges.

Pump 14 and motor 15 are secured to a first movable vehicle 25 having two pairs of wheels 26. Wheels 26 roll on a pair of parallel tracks 27 and vehicle 25 may be provided with conventional quick release track locks for holding pump 14 stationary. Tracks 27 are located below vessel 10 and conduit means 11.

A radioactivity containment shield 28 made from concrete or lead encloses vessel 10, conduit means 11 and vehicle 25. A slidable door 29 permits access to the inside of shield 28 through a doorway 30, and tracks 27 pass through doorway 30 and extend beyond the outside of shield 28.

A second or spare high volume pump 31 and its motor 32 are mounted on a second wheeled vehicle 33 located near door 29 outside of shield 28 adjacent tracks 27. Spare pump 31 and second wheeled vehicle 33 are substantially identical, respectively, to working pump 14 and first wheeled vehicle 25, so corresponding parts have identical reference numbers. Second vehicle 33 may be suspended in the air by a removable bracket 34 directly above tracks 27. Or, as indicated by dotted lines in FIG. 2, a pair of curved spur tracks 35 may extend at an angle to tracks 27, and second wheeled vehicle 33 and pump 31 would then be kept on spur tracks 35.

If first pump 14 should malfunction or stop operating, its electrical control switch located outside of shield 28 would be opened to stop the flow of electricity. Door 29 would then be opened and a worker would enter shield 28 through doorway 30 and release couplings 19 by unscrewing nuts 22, sliding channels 23 away from each other, and lifting them off of the flanges. The worker would then release the track loads on wheels 26, and vehicle 25 would be rolled on tracks 27 out of shield 28 beyond where second vehicle 33 is waiting. Second vehicle 33 would be lowered, rolled or lifted on to tracks 27, depending on how it is stored in readiness. Vehicle 33 would then be rolled on tracks 27 through doorway 30 into shield 28 until vertical flange 18 on spare pump 31 is moved into abuttment with its mating flange 13 on conduit means 11. This would result in horizontal flange 17 on spare pump 31 being directly beneath its mating flange 12 on vessel 10. The worker would actuate the track locks on wheels 26 and then would tighten nuts 22 until channels 23 of couplings 19 securely seal the pairs of mating flanges. The worker would then leave shield 28, door 29 would be closed and the switch controlling flow of electricity to motor 32 would be closed, thus starting operation of pump 31 and the waste treatment system.

It has thus been shown that by the practice of this invention, exposure of workers to radioactivity if high volume pump 14 fails would be reduced to a minimum, as would the time when the waste treatment system would have to be shut down. Spare pump 31 can be inspected frequently and kept ready for instant substitution into the system without exposing workers to radioactivity. Also, the size of shield 28 need not be increased to enclose spare pump 31.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. Apparatus for concentrating aqueous radioactive waste, comprising:

(a) a vessel in which said waste is concentrated, and conduit means through which said waste is fed into said vessel, said vessel and said conduit means each having external flanges;

(b) a first high volume pump and its motor for feeding said waste through said conduit means into said vessel, said first pump having a pair of flanges mating with those of said vessel and said conduit means, releasable means connecting said flanges on said first pump, conduit means and vessel;

(c) a first movable wheeled vehicle upon which said first pump and motor are secured, and a pair of horizontal tracks upon which said wheeled vehicle is mounted said tracks being below said vessel and said conduit means;

(d) a radioactivity containment shield enclosing said vessel, conduit means, and first wheeled vehicle and its pump and motor; a door in said shield, said tracks passing beneath said door and extending beyond the outside of said shield;

(e) a second high volume pump and its motor mounted on a second wheeled vehicle located near said door outside of said shield adjacent said tracks, said second pump and second wheeled vehicle being substantially identical to said first pump and wheeled vehicle;

(f) whereby, upon failure of said first pump, said first wheeled vehicle and pump is rolled from said shield through said door on said tracks beyond said second wheeled vehicle and pump, said second wheeled vehicle and pump are placed on said tracks and rolled through said door into said shield where the flanges on said second pump are connected to the mating flanges on said vessel and conduit means.

2. The invention defined in claim 1, wherein said second wheeled vehicle and pump are suspended in the air above said tracks outside of said shield.

3. The invention defined in claim 1, further comprising a pair of spur tracks extending at an angle to said tracks outside of said shield, and said second wheeled vehicle and pump being on said spur tracks.

4. The invention defined in claim 1, wherein said external flange on said vessel lies in a horizontal plane, and said external flange on said conduit means lies in a vertical plane.

5. The invention defined in claim 4, further comprising the flange on said first and second pumps which mates with the flange on said conduit means being in a vertical plane and the flange on said first and second pumps which mates with the flange on said vessel being in a horizontal plane.

6. The invention defined in claim 5, wherein said flanges are constructed and arranged such that when the vertical flange on said pumps is moved into abuttment with said flange on said conduit means, the horizontal flange on said pumps will be directly beneath said flange on said vessel.

7. The invention defined in claim 1, wherein said releasable means connecting said flanges are quick release clamps.

8. The invention defined in claim 8, wherein said quick release clamps each further comprise a pair of clamping channels slidable in the plane of each pair of mating flanges.

9. Apparatus for concentrating aqueous radioactive waste, comprising:

(a) a vessel in which said waste is concentrated, and conduit means through which said waste is fed into said vessel, said vessel having an external flange lying in a horizontal plane and said conduit means having an external flange lying in a vertical plane;

(b) a first high volume pump and its motor for feeding said waste through said conduit means into said vessel, said first pump having a horizontal flange mating with said flange of said vessel and a vertical flange mating with said flange of said conduit means, quick release clamps connecting said flanges on said first pump, conduit means and vessel, each comprising a pair of clamping channels slidable in the plane of each pair of mating flanges;

(c) a first movable wheeled vehicle upon which said first pump and motor are secured, and a pair of horizontal tracks upon which said wheeled vehicle is mounted, said tracks being below said vessel and said conduit means;

(d) a radioactivity containment shield enclosing said vessel, conduit means, and first wheeled vehicle and its pump and motor; a slidable door for a doorway in said shield, said tracks passing beneath said door and extending beyond the outside of said shield;

(e) a second high volume pump and its motor mounted on a second wheeled vehicle located near said door outside of said shield adjacent said tracks, said second pump and second wheeled vehicle being substantially identical to said first pump wheeled vehicle;

(f) whereby, upon failure of said first pump, said door is opened and said first pump is rolled from said shield through said doorway on said tracks beyond said second pump, said second wheeled vehicle and second pump are placed on said tracks and rolled through said doorway into said shield where the flanges on said second pump can be connected by said slidable clamping channels to the mating flanges on said vessel and conduit means, said flanges being constructed and arranged such that when the vertical flange on one of said pumps is moved into abuttment with said flange on said conduit means, the horizontal flange on such pump will be directly beneath said flange on said vessel.

* * * * *